UNITED STATES PATENT OFFICE.

THOMAS L. EDWARDS, OF PETERBORO, ONTARIO, CANADA.

SHOCK-ABSORBER.

1,198,829.  Specification of Letters Patent.  Patented Sept. 19, 1916.

Application filed April 1, 1915. Serial No. 18,622.

*To all whom it may concern:*

Be it known that I, THOMAS L. EDWARDS, a subject of the King of Great Britain, residing at the city of Peterboro, in the county of Peterboro, Province of Ontario, and Dominion of Canada, having invented certain new and useful Improvements in Shock-Absorbers, do hereby declare that the following is full, clear, and exact description of the same.

My invention relates to that class of a shock absorber adapted to be connected in between the springs or body part of a vehicle to check the recoil, and prevent impact of the parts in the event of the vehicle traveling over rough or uneven roads, or when striking an obstacle. At the same time, I provide for the flexibility of the springs, by the device, which consists of a cylinder containing a fluid and a piston working therein; the piston being constructed as to travel slowly toward one end of the cylinder and rapidly toward the other.

Figures 1, 2:
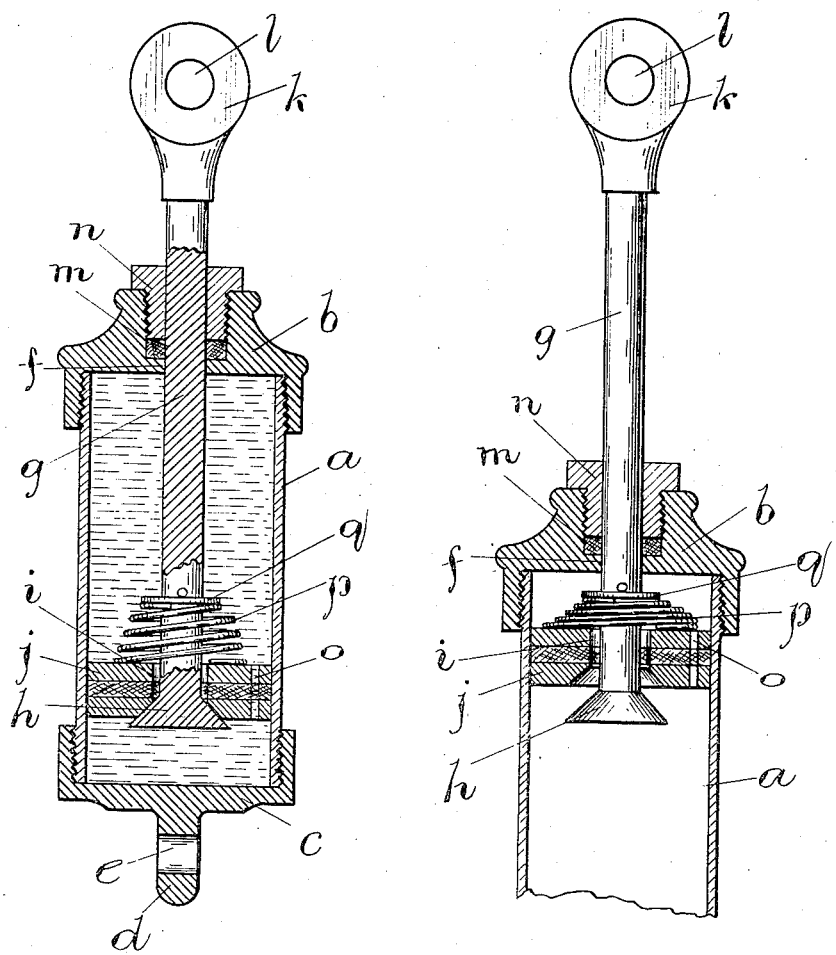
Figure 3:
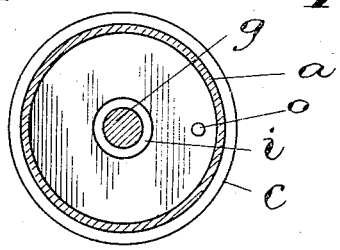

In the drawings:—Figure 1 is a sectional elevational view; Fig. 2 is a sectional detail view; and, Fig. 3 is a sectional plan view.

Like letters of reference refer to like parts throughout the specification and drawings.

$a$ designates a cylinder closed at both ends by screw-threaded caps $b$ and $c$ respectively. Formed integral with the cap $c$ is a lug $d$ having an eye $e$ formed therethrough, to facilitate in connecting with any convenient part of the springs, or body part of the vehicle. In the cap $b$ is a bore $f$, and passing through the bore $f$ is a spindle $g$. The inner end of the spindle $g$ being formed with a conical shaped head $h$ engaging within a correspondingly shaped passage $i$, formed in a piston $j$ adapted to ride up and down within the cylinder $a$. The outer end of the spindle $g$ is provided with a head $k$ and an eye $l$ to facilitate in connecting the end of the spindle with any part of the spring, or the vehicle body. Formed in the cap $b$, in close relation with the bore $f$, is a stuffing-box $m$; and fitted in the stuffing-box is a screw-threaded packing ring $n$ adapted to actuate in the double capacity as a guide for the spindle $g$, and a packing ring for the stuffing-box $m$.

$o$ designates a by-pass formed through the piston $j$ to allow the fluid contained within the cylinder to slowly pass from one end of the cylinder to the other, while the piston is traveling toward the cap $b$.

$p$ designates a helical spring surrounding the spindle $g$, and interposed between one face of the piston $j$ and an annular flange $q$ fastened on the spindle $g$.

Contained within the cylinder $a$ is a non-freezable fluid, which acts as a cushion in the place of springs. In adjusting the absorber in position, the spindle will be regulated to bring the piston, when in normal position, about midway within the cylinder. When the piston travels toward the cap $b$, the fluid in one end of the cylinder displaces itself by passing through the by-pass $o$, and allows for a slow travel of the piston in this direction by the resistance of the fluid. When the piston is traveling in the opposite direction toward the cap $c$, the distance between the eye $e$ and the eye $l$ are shortened by the inward travel of the spindle $g$ toward the cap $c$ by the compression of the spring $p$. By the compression of the spring $p$, the relation of the piston and spindle will change, as illustrated in Fig. 2, whereby the conical shaped head $h$ of the spindle will unseat itself from the correspondingly shaped seat in the bore $i$ formed through the center of the piston.

The fluid contained within that section of the cylinder, between the piston and the cap $c$ will displace by passing through the by-pass $o$, and the bore $i$, in the piston which is somewhat greater in diameter than the diameter of the spindle and greatly reduce the resistance of the piston, and allow the piston to travel toward the cap $c$, with less resistance and greater rapidity than in the opposite travel toward the cap $b$.

The cylinder will be situated in combination with the springs of the vehicle, whereby the piston will travel in a slow action, as the springs come together to eliminate a sudden bumping of the parts together.

What I claim as new and desire to secure by Letters Patent is:—

1. A shock-absorber, a fluid containing cylinder, screw caps on the ends of said cylinder, fastening means on one of said caps, a piston situated within said cylinder, a by-pass formed through said piston, a spindle longitudinally arranged in said cylinder, said spindle extending through one of the caps fitted on one end of the said cylinder, the inner end of the said spindle passing through a center opening formed through the said piston, a compressible spring encircling and fixed at one end with the said spindle, the other end of said spring engaging with the said piston, as and for the purpose specified.

2. A shock-absorber, a fluid containing cylinder, screw caps on the ends of said cylinder, a piston situated within said cylinder, a by-pass formed through said piston, a spindle passing through one of the said caps of said cylinder, the inner end of said spindle passing through a center opening in said piston, a conical shaped end formed on said spindle, said conical shaped end adapted to engage in a conical shaped seat formed with said center opening, a helical shaped compressible spring encircling and fixed at one end with said spindle, the other end of said spring engaging against the said piston, fastening means formed on the end of the said spindle and one of the said screw caps, as and for the purpose specified.

Signed at Peterboro, in the county of Peterboro, and Province of Ontario, this 22nd day of March 1915.

THOMAS L. EDWARDS.

In the presence of—
 C. R. WEDDEFORD,
 J. AMES.